United States Patent Office 2,716,654
Patented Aug. 30, 1955

2,716,654
2-ACYLAMINO-3-ALKYLSULFONYL ANTHRAQUINONES

Harry E. Westlake, Jr., Somerville, and William B. Hardy, Bound Brook, N. J., assignors to American Cyanamid Company, New York, N. Y., a corporation of Maine No Drawing. Application May 21, 1952,
Serial No. 289,203

8 Claims. (Cl. 260—372)

This invention relates to 2-acylamino-3-alkylsulfonyl anthraquinones having the general formula:

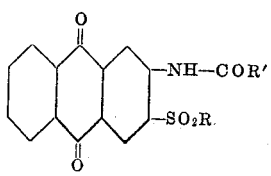

in which R is an alkyl group of not more than four carbon atoms and R'CO represents an acyl radical.

The new products of the present invention are useful as intermediates for the preparation of vat dyestuffs. They are reduced and transformed into their leuco sulfuric acid half esters and the acylamino group hydrolyzed to amino. Then, the half esters are subjected to ring closure to form the corresponding indanthrene dyestuffs which have valuable new properties. Greenish-blue shades of excellent fastness to light and hypochlorite oxidation are obtained which shades cannot be matched by mixtures of other vat dyestuffs. Also, the effect of the alkyl sulfonyl group on the shade is anomolous. Instead of producing a hypsochromic effect, which is the ordinary result, when alkyl sulfonyl groups are introduced into these indenthrene dyestuffs the shade is deepened and the effect of the sulfonyl group is exactly the opposite, namely, a bathochromic effect.

The amino alkyl sulfonyl leuco sulfuric acid half esters are not claimed in the present application forming the subject matter of our co-pending application Serial No. 289,202, filed May 21, 1952. Similarly the new indanthrene dyestuffs are also not claimed here forming the subject matter of our co-pending application Serial No. 289,201, filed May 21, 1952. While the production of the half esters and the transformation into the new indanthrene dyestuffs is the most important single field of utility of the compounds of the present invention, their usefulness is in no sense limited to producing indanthrene dyestuffs. They may also be used as intermediates to produce other types of vat dyes such as those having the flavanthrene, anthrimide, thiazine, thiazole, acridone and similar rings.

While it is not intended to limit the present invention to the use of any particular process of making the new compounds, we have found that it is desirable to prepare them by alkylating a salt of a 2-acylamino-3-mercapto-anthraquinone to form the corresponding alkyl sulfide and then oxidizing the sulfide group either in one or a series of steps to the sulfones. In a more restricted aspect of the present invention, therefore, this process is included.

As has been pointed out above, in the group formula, the alkyl group may be any alkyl radical that does not have more than four carbon atoms, and of course includes methyl, ethyl, propyl, isopropyl, butyl, isobutyl and secondary butyl.

The function of the acyl radical is to protect the amino group from attack during the alkylation and oxidation steps. It can be removed at any point at which no further protection is needed. To utilize this invention further in the preparation of vat dyes, it will be necessary to remove the acyl group. It is therefore preferable from the economic standpoint that the acyl group used be of low molecular weight and inexpensive to use. However, any acyl group which can be easily removed can be used. Examples of such acyl groups are formyl, acetyl, propionyl, butyryl, valeryl, and other aliphatic carboxyl groups, benzoyl and substituted benzoyl, naphthoyl and substituted naphthoyl, thenoyl and substituted thenoyl; in short, any acyl group which will remain unchanged through the series of reactions and can be easily removed later will serve.

The preparation of the 2-acetylamino-3-mercapto anthraquinone, which is the first step in the process of preparing the compounds of the present invention, may be effected by the reaction of a suitable halogen anthraquinone with metallic polysulfides. The reaction mixture should include a solvent or diluent in which the anthraquinone and metal sulfide have sufficient mutual solubility to react.

We have preferred to use pyridine slightly diluted with water, but other solvents or mixtures of solvents with the proper characteristics will serve. Examples of such solvents are other pyridine bases such as the picolines, glycol, and polyglycols, either singly, or mixed with one another, or with water. We have preferred to use sodium sulfides but other metal sulfides such as potassium will serve.

The metallic mercaptide may be alkylated directly in the reaction mixture in which it was formed or may be isolated by salting out. We have preferred the latter to prevent the formation of undesirable by-products. The alkylation may be carried out by the use of dialkyl sulfates or alkyl halides as is convenient from the standpoint of procedure, availability, and reactivity. When dialkyl sulfates are used, an acid binding agent is necessary to prevent removal of the unalkylated mercaptan from the sphere of reaction through precipitation. Examples of such acid binding agents are the alkali hydroxides and carbonates. Such alkylations are best run in water. When alkyl halides are used, the reaction is best run in a polar organic solvent such as an alcohol, in which the mercaptide is partially soluble. No acid binding agent is necessary in this procedure.

The oxidation to the sulfoxide or the sulfone can be carried out by known methods. Mild oxidation agents and mild conditions give the sulfoxides, while more drastic conditions give the sulfones. Examples of oxidizing agents which are usable are hydrogen peroxide, chromium trioxide and potassium permanganate.

The invention is illustrated in the following examples, in which the parts are by weight unless otherwise indicated.

Example 1

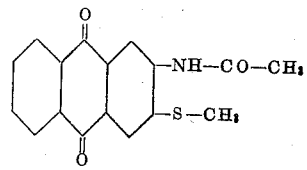

A mixture of 83 parts of sodium sulfide, 21.2 parts of sulfur, 360 parts of pyridine, and 36 parts of water is stirred and heated until a complete solution is obtained. To this is added 68.6 parts of 2-acetylamino-3 bromoanthraquinone. The mixture is stirred at 90° until the reaction is complete and then is drowned in 2000 parts by volume of water. The drowned mixture is distilled until the pyridine is removed. The hot residual solution is treated with 120 parts of sodium chloride. When the mixture is cooled to 20° C., the sodium mercaptide precipitates. This is filtered and washed with 400 parts by volume of 20% brine, and then reslurried in 200 parts by volume of water. 80 parts of soda ash is added to the slurry, which is then stirred at room temperature while 72 parts by volume of dimethyl sulfate is added dropwise. The mixture is then stirred overnight. A yellow precipitate appears which is filtered, washed neutral, and dried. This can be recrystallized from dichlorobenzene to give green-yellow crystals of 2-acetylaminoanthraquinoyl-3 methyl sulfide.

*Example 2*

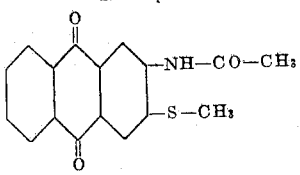

A mixture of 60 parts of pyridine, 13.8 parts of sodium sulfide, 3.63 parts of sulfur, and 6 parts of water is stirred at 40 to 50° C. until a solution is obtained. To this is added 10 parts of 2-acetylamino-3 chloroanthraquinone. The mixture is stirred at 90° C. until the reaction is complete and then drowned in 250 parts by volume of water. The drowned mixture is distilled until the pyridine is removed. The hot residual solution is treated with 40 parts by volume of 20% sodium hydroxide solution and diluted with 250 parts by volume of water. When the mixture has cooled to 60° C., it is stirred while 140 parts by volume of dimethyl sulfate is added gradually. A yellow precipitate appears which is filtered, washed with water until neutral, and dried. The product is identical with that from Example 1.

*Example 3*

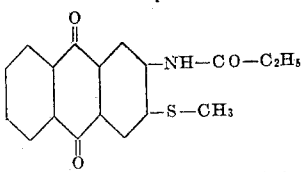

A solution of sodium disulfide in slightly aqueous pyridine is prepared as described in Example 1. To this is added 71.4 parts of 2-propionylamino-3 bromoanthraquinone. The reaction is carried out by the same procedure as that given in Example 1. The product, 2-propionylamino-anthraquinonyl-3 methyl sulfide, is a yellow crystalline solid which may be recrystallized from dichlorbenzene.

*Example 4*

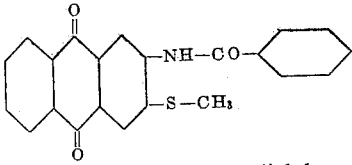

A solution of sodium disulfide in slightly aqueous pyridine is prepared as described in Example 1. To this is added 102.5 parts of 2-benzoylamino-3 bromoanthraquinone. The reaction is then carried out by the same procedure as that given in Example 1. The product, 2-benzoylaminoanthraquinonyl-3 methyl sulfide, is a yellow crystalline solid which may be recrystallized from dichlorbenzene.

*Example 5*

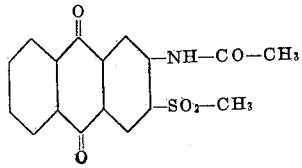

A mixture of 74 parts of 2-acetylaminoanthraquinonyl-3-methyl sulfide and 700 parts by volume of glacial acetic acid is stirred while a solution of 100 parts of potassium permanganate in 30 parts of hot water is added. The permanganate is washed into the mixture with an additional batch of 700 parts by volume of acetic acid. The mixture is stirred at the boil until reaction is complete. It is then cooled to 70° and a quantity of sodium bisulfite is added sufficient to decompose the precipitated manganese dioxide. The reaction mixture is drowned in 2000 parts by volume of ice and water. The precipitated 2-acetylaminoanthraquinonyl-3-methyl sulfone is filtered, washed neutral and dried. The sulfone, when recrystallized from dichlorobenzene, is obtained in the form of pale yellow crystals.

2-propionylaminoanthraquinonyl-3 methyl sulfide and 2-benzoylaminoanthraquinonyl-3-methyl sulfide can be similarly oxidized. These sulfones can be converted, for example, by known processes through their leuco sulfuric esters, to bis 3,3' methylsulfonyl indanthrene. The various acyl groups can be removed to give 2-aminoanthraquinonyl-3 methyl sulfone, useful in the preparation of other dyestuffs.

*Example 6*

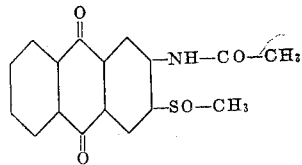

3.1 parts of 2-acetylaminoanthraquinonyl-3 methyl sulfide, 50 parts by volume of glacial acetic acid, and 2.5 parts of 30% hydrogen peroxide are stirred together overnight without heating. The mixture is then heated to 50° C. until reaction is complete after which it is drowned in water. The precipitated product is isolated by filtration, washed, and dried. The 2-acetylaminoanthraquinonyl-3 methyl sulfoxide can be recrystallized from dichlorobenzene to give a yellow crystalline product.

2 - acetylaminoanthraquinonyl - 3 methyl sulfoxide, when treated with potassium permanganate in acetic acid solution in the same manner as described in Example 5 for the direct oxidation of 2-acetylaminoanthraquinonyl-3 methyl sulfide, gives 2-acetylaminoanthraquinonyl-3 methyl sulfone, identifiable by mixed melting points as identical with the product from Example 5.

*Example 7*

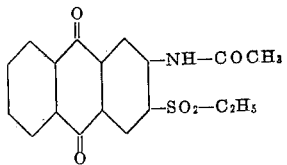

A solution of the sodium salt of 2-acetylamino-3-mercaptoanthraquinone (prepared, isolated, and reslurried in the same quantities and manner as described in Example 1), to which is added 90 parts of soda ash, is treated at 80° C. with 90 parts of diethyl sulfate until ethylation is complete. The crude 2 - acetylaminoanthraquinonyl-3-ethyl sulfide is filtered washed and dried. This product may be recrystallized from dichlorobenzene.

The sulfide is converted to 2-acteylaminoanthraquinonyl-3 ethyl sulfone by the same process as described in Example 5 for the methyl compound. This yellow crystalline compound can be recrystallized from dichlorobenzene. By the use of known processes, the sulfone can be converted to the leuco sulfuric acid ester potassium salt of 2-acetylaminoanthraquinonyl-3 ethyl sulfone. This can be hydrolyzed to the free amine and oxidized with nickel dioxide to give the leuco sulfuric acid ester potassium salt of 3,3'-diethyl sulfonyl indanthrene. This is a brown crystalline solid when isolated, soluble in water with a green fluorescence in dilute solution, dyeing cellulose fibers, when applied by the usual method, a bright green-blue of good fasteness. The acetyl group can be removed by alkaline hydrolysis of acylaminoanthraquinonyl ethyl sulfone to give 2-aminoanthraquinonyl-3 ethyl sulfone, useful in the preparation of other dyestuffs.

*Example 8*

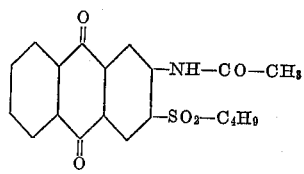

A wet filter cake of the sodium salt of 2-acetylamino-3-mercaptoanthraquinone (prepared and isolated in the same quantities and manner as described in Example 1) is slurried in 1000 parts by volume of ethanol. 37 parts of butyl iodide is added and the mixture is stirred at the boil. There is an almost immediate formation of a yellow precipitate after standing to permit complete precipitate formation. The mixture is cooled after the precipitate is filtered, washed, extracted with hot water to remove inorganic salts, and dried. The 2-acetylaminoanthraquinonyl-3-butyl sulfide can be recrystallized from dichlorobenzene.

By treating the sulfide with permanganate, as described in Example 5, 2-acylaminoanthraquinonyl-3-butyl sulfone is obtained, which can be recrystallized from dichlorobenzene.

The butyl sulfone can be esterified, hydrolyzed, and oxidized by known methods, as indicated in Examples 5 and 7, to give the leuco sulfuric acid ester potassium salt of 3,3'-bis-butyl sulfonyl indanthrene, which is a brown crystalline solid, soluble in water with a green fluorescence when diluted, which dyes cellulose fibers by the usual method of application a bright green blue of good fastness. The acetyl groups can be removed from the sulfone to give 2-aminoanthraquinonyl-3-butyl sulfone, useful in the preparation of other dyestuffs.

We claim:

1. Compounds of the general formula

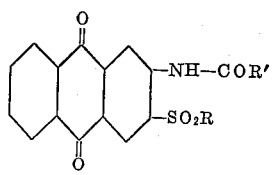

wherein R represents an alkyl radical of not more than four carbon atoms, R'CO represents an acyl radical.

2. Compounds of the general formula

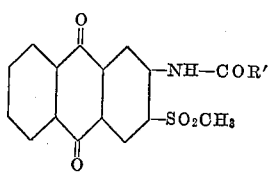

wherein R'CO represents an acyl radical.

3. Compounds of the general formula

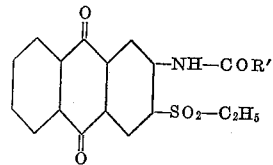

wherein R'CO represents an acyl radical.

4. Compounds of the general formula

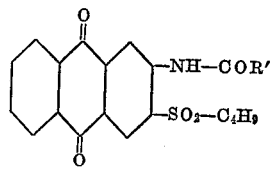

wherein R'CO represents an acyl radical.

5. Compounds of the general formula

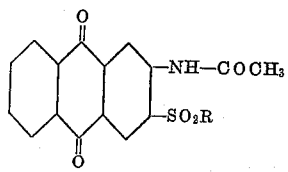

wherein R represents an alkyl radical of not more than four carbon atoms.

6. The compounds of the formula

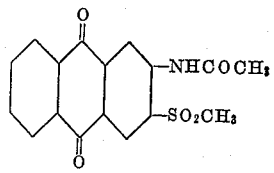

7. The compounds of the formula

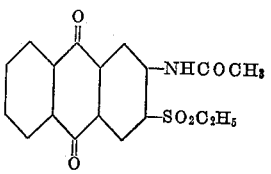

8. The compounds of the formula

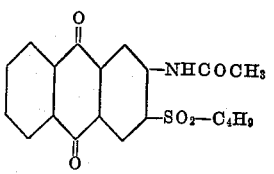

References Cited in the file of this patent

UNITED STATES PATENTS

| 1,744,055 | Murch et al. | Jan. 21, 1930 |
| 2,176,630 | Klein | Oct. 17, 1939 |
| 2,644,824 | Jenny et al. | July 7, 1953 |

FOREIGN PATENTS

| 263,178 | Great Britain | Mar. 19, 1928 |